United States Patent
Jain

(10) Patent No.: US 10,275,259 B1
(45) Date of Patent: *Apr. 30, 2019

(54) MULTI-STAGE BOOTING OF INTEGRATED CIRCUITS

(71) Applicant: Xilinx, Inc., San Jose, CA (US)

(72) Inventor: Sunita Jain, Bangalore (IN)

(73) Assignee: XILINX, INC., San Jose, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/008,062

(22) Filed: Jan. 27, 2016

(51) Int. Cl.
G06F 9/445 (2018.01)
G06F 9/4401 (2018.01)

(52) U.S. Cl.
CPC ............ G06F 9/4403 (2013.01); G06F 9/445 (2013.01)

(58) Field of Classification Search
None
See application file for complete search history.

(56) References Cited

U.S. PATENT DOCUMENTS

| | | | | |
|---|---|---|---|---|
| 6,154,793 A * | 11/2000 | MacKenna | ............. | G06F 13/28 710/10 |
| 7,328,335 B1 * | 2/2008 | Sundararajan | ...... | G06F 15/7867 710/8 |
| 8,352,898 B1 | 1/2013 | Kellermann | | |
| 9,529,601 B1 * | 12/2016 | Dharmadhikari | ..... | G06F 9/4406 |
| 2009/0144508 A1 * | 6/2009 | Freimuth | ............ | G06F 12/1027 711/145 |
| 2013/0124840 A1 * | 5/2013 | Diluoffo | ............... | G06F 21/575 713/2 |
| 2016/0300064 A1 * | 10/2016 | Stewart | .................. | G06F 21/575 |
| 2017/0123815 A1 * | 5/2017 | Sarmah | .................. | G06F 9/4408 |

OTHER PUBLICATIONS

Specification and drawings for U.S. Appl. No. 14/931,037, filed Nov. 13, 2015, Sarmah et al.
Specification and drawings for U.S. Appl. No. 15/004,319, filed Jan. 22, 2016, Mitra et al.

\* cited by examiner

*Primary Examiner* — Kim Huynh
*Assistant Examiner* — Joshua Neveln
(74) *Attorney, Agent, or Firm* — LeRoy D. Maunu

(57) ABSTRACT

Methods and systems are disclosed for booting an integrated circuit (IC). In an example implementation, boot read only memory (ROM) code is loaded for execution by a processor circuit of the IC. Via execution of the boot ROM code on the processor circuit, a first boot image is retrieved. A memory address is communicated from a host device to the processor circuit of the IC via an external data bus coupled to a bus interface circuit in the IC. The bus interface circuit is configured by execution of the first boot image to map a first block of addresses on the internal data bus to a second block of addresses on the host device starting at the memory address. When bus mastering is enabled, the processor retrieves a second boot image from the host device by issuing read requests to the first block of addresses.

18 Claims, 5 Drawing Sheets

MULTI-STAGE BOOTING OF INTEGRATED CIRCUITS

TECHNICAL FIELD

The disclosure generally relates to loading of boot images, and more particularly to loading boot images in multiple stages.

BACKGROUND

There are a variety of different applications that can use programmable integrated circuits (ICs). Programmable ICs programmable resources (e.g., logic circuits and/or programmable routing resources) that can be programmed to implement various circuit designs. One type of programmable IC, referred to as a field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet, and so forth.

Some ICs include enough components and functionality to effectively serve as a computer system on a single IC chip. ICs with such functionality are sometimes referred to as a system on a chip (SOC). An SOC can include one or more processor circuits that execute software instructions in order to carry out different functions and/or include programmable resources that can be programmed to form various circuit designs. Upon startup (e.g., hard-power on or hard reset), the SOC can first execute a boot read only memory (ROM) code that configures the SOC to retrieve and load a boot image. The boot image can specify how peripheral functional blocks of the SOC are configured, control and implement a configuration bitstream, setup and run the operating system (OS), and/or perform other boot-related functions. Often, the boot image for an SOC can be retrieved and loaded from an external device coupled to an SOC.

SUMMARY

Various implementations are directed to methods for loading images for booting a IC (e.g., a SOC). In an example implementation, boot ROM code is loaded for execution by a processor circuit of the IC. Via execution of the boot ROM code on the processor circuit, a first boot image is retrieved and executed. A memory address is received from a host device to the processor circuit of the IC via an external data bus coupled to a bus interface circuit in the IC. The bus interface circuit is configured by execution of the first boot image to translate a first block of addresses on the internal data bus to a second block of addresses on the host device starting at the memory address. In response to bus mastering by the bus interface circuit being enabled, a second boot image stored at the second block of addresses on the host device is retrieved by issuing read requests to addresses in the first block of addresses via execution of the first boot image.

In another example implementation, a IC includes a ROM, a bus interface circuit, and a processor circuit coupled to an internal data bus. The bus interface circuit is configured to communicate with a host device coupled to the IC via an external data bus. The processor circuit is configured to, when powered on, retrieve and execute a set of boot code stored in the ROM. Execution of the boot code by the processor circuit causes the processor circuit to retrieve and execute a first boot image. Execution of the first boot image by the processor circuit causes the processor circuit to configure the bus interface circuit to translate a first block of addresses on the internal data bus to a second block of addresses on the host device starting at the memory address. Execution of the first boot image also causes the processor circuit to, in response to bus mastering by the bus interface circuit being enabled, retrieve a second boot image stored at the second block of addresses on the host device by issuing read requests to addresses in the first block of addresses. Execution of the first boot image further causes the processor circuit to execute the second boot image.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
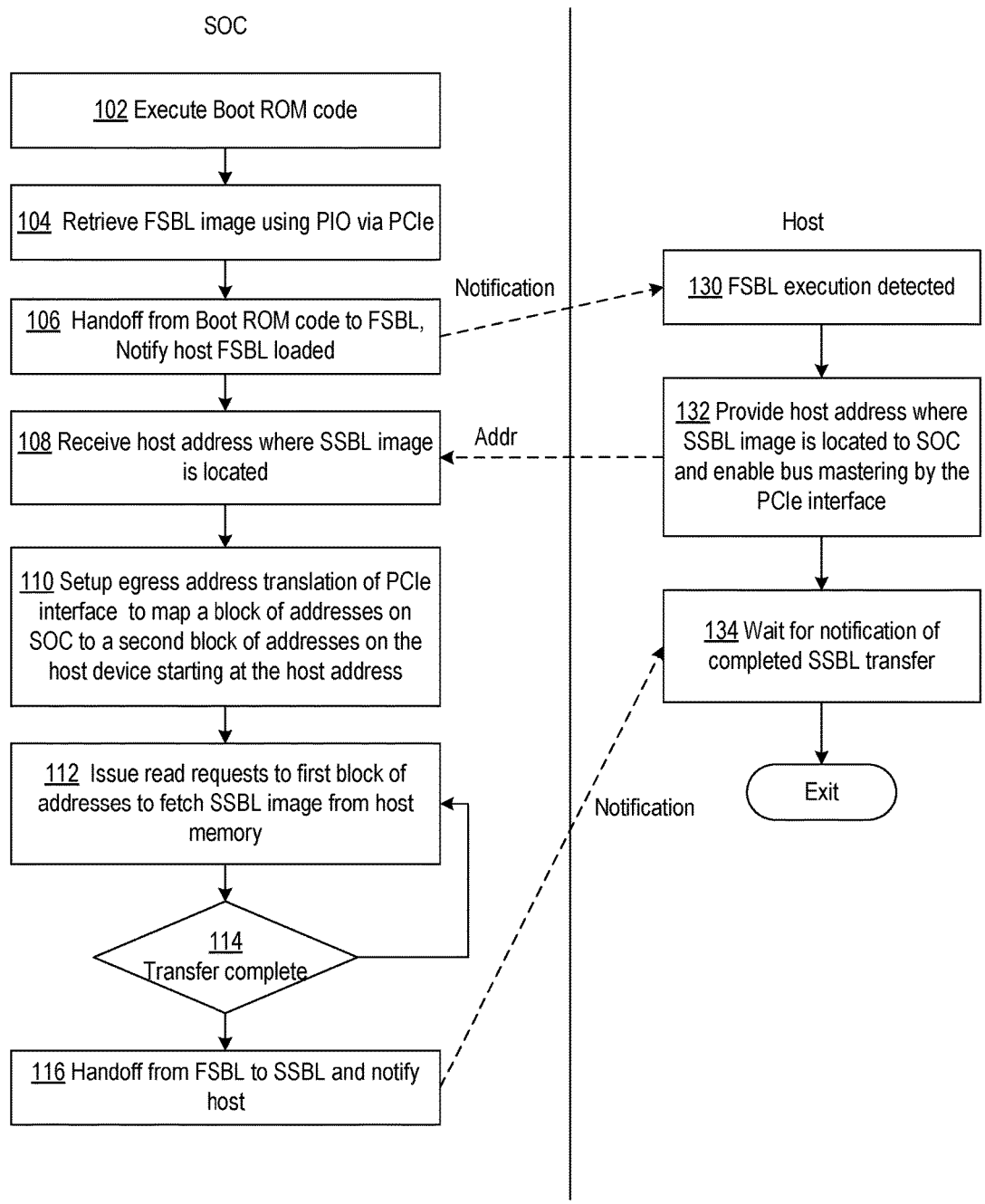
FIG. 1 shows a flow diagram of a first example process for booting a SOC, consistent with one or more implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

As the complexity of system designs implemented on SOCs increases, the size of the boot image and the time required to retrieve and load the boot image also increases. The increased retrieval and load time can be problematic in instances where it is desirable to have the SOC available quickly, whether upon power-up or in similar situations. In some approaches, loading of a boot image into a SOC is controlled by a host device coupled to the SOC. For example, when startup of the SOC is detected, a processor on the host device may provide a boot image to the SOC over an external data bus using a sequence of 4-byte programmable input/output (PIO) transfers. However, PIO is relatively slow and may require an excessive amount of time for transfer of large data files. Moreover, use of PIO transfers take processing time that may otherwise be used to perform other tasks on the host device, because with PIO transfers are initiated by program code executed on the processor.

Alternatively, transfer of a boot image from a memory in the host device via the external data bus may be controlled by the SOC. For example, a master data bus interface in the host device may enable bus mastering by a slave interface in the SOC. However, a processor on the SOC may not be able to issue data transactions to memory in the host device if the SOC operates in a different address space than the host device. For instance, components of the SOC may communicate with each other using an internal 32-bit data bus and components of the host device may communicate with each other using an internal 64-bit data bus. In some implementations, the data bus interface of the SOC includes a dedicated Direct Memory Access (DMA) control circuit. The DMA control circuit facilitates fast data transfers via the external data bus without the use of a processor circuit. Rather, the DMA controller independently negotiates required address mapping with the host device and initiates all data transfers necessary to retrieve a data file without involving a processor. However, circuitry required to implement a dedicated DMA control circuit can significantly increase die space and manufacturing costs of a SOC.

Various implementations are directed toward methods and systems for loading boot images in a SOC using bus mastering of an external data bus without use of a dedicated DMA manager circuit. In some implementations, boot ROM code executed by a processor circuit at startup of a SOC causes the processor circuit to retrieve and execute a first-stage-boot-loader (FSBL) image. A memory address is received from a host device that indicates a memory location on the host device where a second-stage-boot-loader (SSBL) image is located.

Execution of the first boot image configures a bus interface circuit on the SOC to translate a first block of addresses on the internal data bus to a second block of addresses on the host device starting at the received memory address. The translation of memory addresses by the bus interface circuit allows the processor on the SOC to issue data transactions to the second block of addresses via the first block of addresses, even though the addresses may not be within the address space used for communication in the SOC. When the host enables bus mastering of the external interface, the FSBL image causes the processor of the SOC to retrieve the SSBL by issuing read requests to addresses in the first block of addresses via execution of the first boot image. Because read requests are issued directly by the processor on the SOC, a dedicated DMA control circuit may be omitted and manufacturing costs may be reduced.

In some implementations, the configuration of the data bus interface can be carried out entirely from within the boot ROM. For example, the boot ROM code executed at startup may cause the processor on the SOC to configure the data bus interface to retrieve a boot image using bus mastering of the external data bus without a dedicated DMA control circuit. More specifically, the host device communicates a memory address where the boot image is located in response to detecting startup of the SOC. Execution of the boot ROM code configures the bus interface circuit to translate a first block of addresses on the internal data bus to a second block of addresses on the host device starting at the received memory address. The boot ROM code further causes the processor to retrieve the boot image by issuing read requests to addresses in the first block of addresses. After the boot image is received, the boot image is executed by the processor.

In some implementations, the boot image is an FSBL configured to cause the processor to retrieve an SSBL image via the external data bus. For example, the FSBL may reconfigure the data bus interface to translate a third block of addresses on the SOC to a fourth block of addresses on the host device starting at a memory address received from the host device. In some implementations, the boot process may include additional boot loader stages. For instance, execution of the SSBL may cause the processor circuit on the SOC to retrieve a third-stage-boot-loader (TSBL) image from the host device.

The internal and external data buses may be implemented using various data bus architectures including, for example, Peripheral Component Interconnect (PCI), PCI Express (PCIe), the Advanced Microcontroller Bus Architecture (AMBA) bus architectures such as Advanced Extensible Interface (AXI), and/or IEEE 802 architectures. For ease of explanation, various implementations may be primarily discussed with reference to use of an external PCIe data bus for communication between a SOC and a host device and AXI data busses for communication within the SOC and a host device. However, it is understood that other protocols, topologies, and configurations are also possible. In certain implementations, the external data bus interfaces of the SOC and host device may utilize a protocol that provides a level of security against third parties wishing to read data contained in the boot image (e.g., using encoding and/or data scrambling techniques).

Turning now to the figures, FIG. 1 shows a flow diagram of a first example process for booting a SOC, consistent with one or more implementations of the present disclosure. At block 102, boot ROM code is executed by a processor in a SOC. At block 104, a first-stage boot loader (FSBL) is retrieved using programmable input/output via PCIe. At block 106, the boot ROM code hands off execution to the FSBL. The FSBL provides a notification to the host device. Notification may be provided, for example, by writing a value to a scratch pad region of a memory in the SOC that is accessible by the host device. The host device may poll the scratch pad region to detect when a value is written by the SOC.

At the host device, execution of the FSBL is detected at block 130. At block 132, the host device provides a host address to the SOC. The host address indicates where an SSBL is located in a memory of a host device. The host address may be communicated to the SOC, for example, by writing the host address to the scratch pad region. At block 132, the host device also enables bus mastering of a PCIe bus by a PCI interface on the SOC. After providing the host address to the SOC, the host device waits at block 134 for notification from the SOC. At block 108, a host address is received by the SOC. At block 110, the FFBL configures a PCIe interface to perform egress address translation that translates a first block of addresses for an internal data bus of the SOC to a second block of addresses in the host device. The second block of addresses begins with the host address.

As previously discussed, the address translation allows a processor on the SOC to access the second block of addresses, via data transactions to the first block of addresses, without the use of a DMA controller. At block 112, read requests are issued to the first block of addresses by the processor on the SOC to retrieve a second stage boot loader (SSBL). When transfer of the SSBL is completed, decision block 114 directs the process to block 116. At block 116, the FSBL hands off operation to the SSBL and a notification is provided to the host device. Once notification is received, the process performed at the host device exits.

Figure 2:
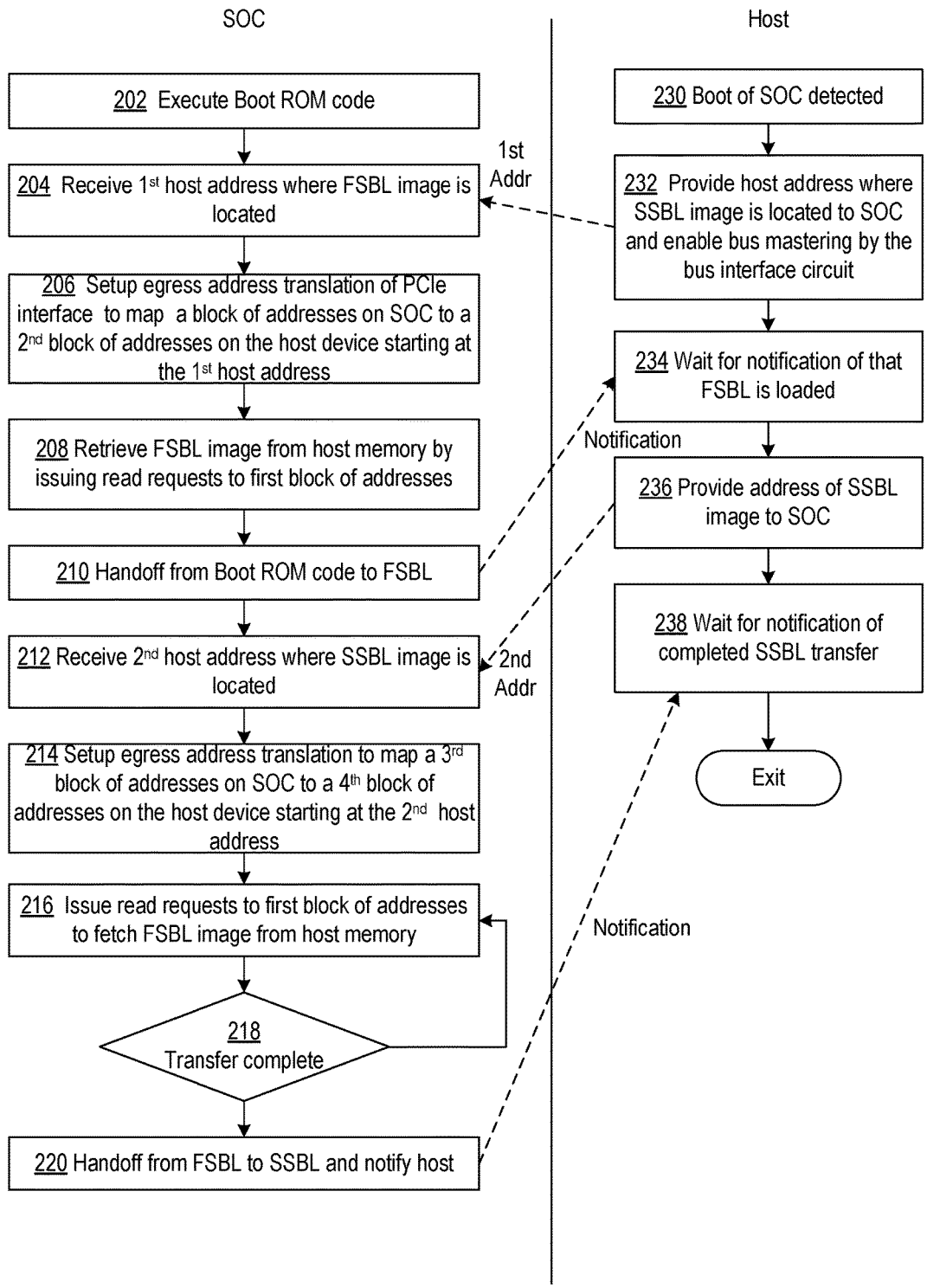
FIG. 2 shows a flow diagram of a second example process for booting a SOC, consistent with one or more implementations of the present disclosure.

FIG. 2 shows a flow diagram of a second example process for booting a SOC, consistent with one or more implementations of the present disclosure. At block 202, boot ROM code is executed by a processor in a SOC. A boot of the SOC is detected by the host device at block 230. At block 232, the host device provides a first host address to the SOC. The first host address indicates a memory location on the host device where an FSBL is located. At block 234, the process performed at the host device waits for a notification that the FSBL is loaded. The first host address is received by the SOC at block 204.

At block 206, the execution of the boot ROM code configures a PCIe interface on the SOC to perform egress address translation that translates a first block of addresses on the SOC to a second block of addresses on the host device. The second block of addresses starts at the first host address received at block 204. At block 208, the boot ROM code causes the processor to retrieve an FSBL from the second block of addresses on the host device by issuing read requests to the first set of addresses. At block 210, the boot ROM code hands off operation to the FSBL and the host device is notified that the FSBL is loaded. At block 236, the host provides a second host address of an SSBL image to the SOC. After providing the host address to the SOC, the host device waits at block 238 for notification that the SSBL is loaded.

At block 212, the second host address is received by the SOC. At block 214, the execution of the FSBL reconfigures the PCIe interface on the SOC to perform egress address translation that maps a third block of addresses on the SOC to a fourth block of addresses on the host device. The fourth block of addresses starts at the second host address received at block 212. At block 216, the FSBL causes the processor to retrieve an SSBL image from the fourth block of addresses on the host device by issuing read requests to the third block of addresses. When transfer of the SSBL is completed, decision block 218 directs the process to block 220. At block 220, the FSBL hands off operation to the SSBL and a notification is provided to the host device. Once notification is received, the process performed at the host device exits.

Figure 3:
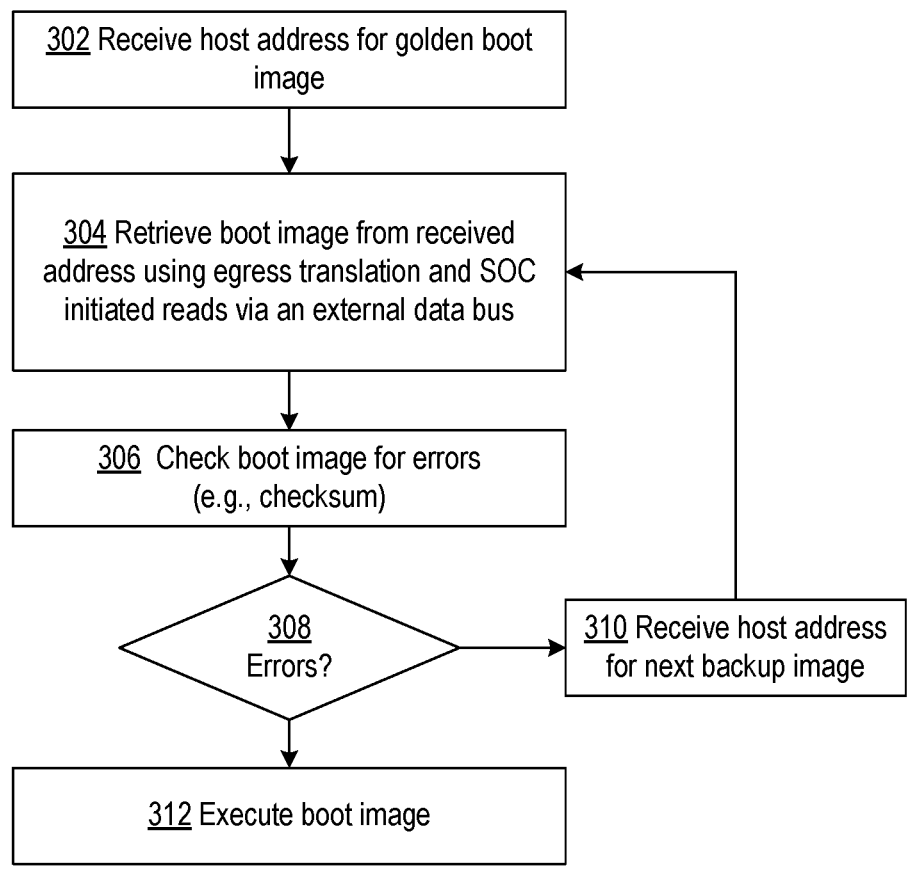
FIG. 3 shows a flow diagram of a third example process for booting a SOC, consistent with one or more implementations of the present disclosure.

In some implementations, the boot ROM and/or FSBL may be configured to retrieve boot loader images from a plurality of different memory locations. For instance, if a first boot image at a first memory location includes errors, the boot ROM and/or FSBL may retrieve a backup copy of the boot image from a different memory location. FIG. 3 shows a flow diagram of a second example process for booting a SOC, consistent with one or more implementations of the present disclosure. At block 302, host addresses are received that indicate where copies of a boot image are located. At block 304, the first copy of the boot image is retrieved from the host address via an external data bus, for example, as described with reference to FIGS. 1 and 2. At block 306, the retrieved boot image is examined for errors. Errors may be detected, for example, by calculating a checksum of the image and comparing the result to a checksum provided with the boot image. If the retrieved image is error free, the calculated checksum will match the checksum provided with the boot image. If the boot image contains errors, decision block 308 directs the process to select the next host address at block 310. A copy of the boot image is retrieved from the selected host address at block 304 and checked for errors at block 306 as previously described. If a retrieved copy of the boot image is error free, decision block 308 directs the process to execute the boot image at block 312.

Figure 4:
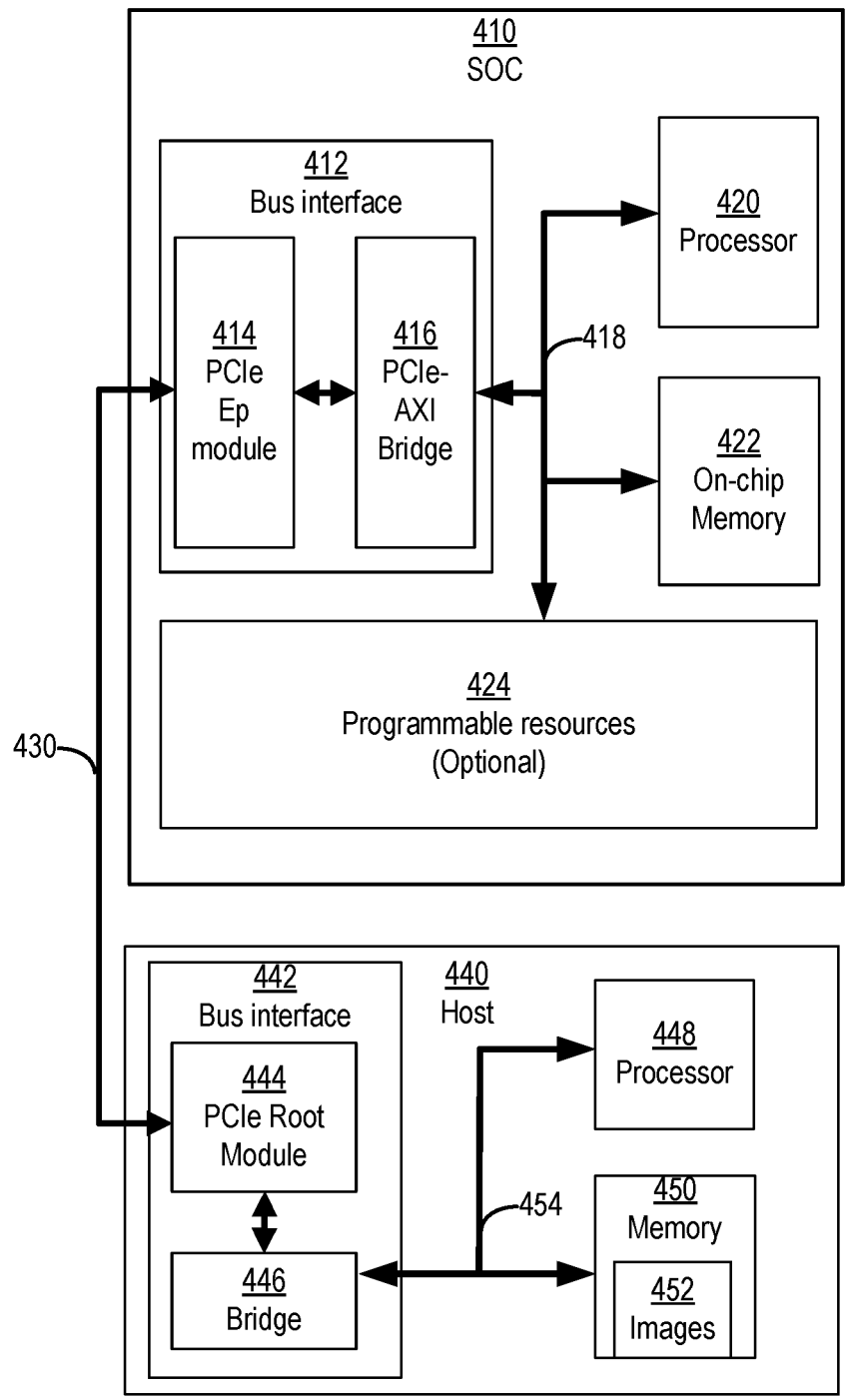
FIG. 4 shows a block diagram of a SOC configured to receive a boot image via an external data bus, consistent with one or more implementations of the present disclosure.

FIG. 4 shows a block diagram of a system consistent with one or more implementations of the present disclosure. The system includes a host device 440 and a SOC 410 interconnected by an external data bus 430. According to certain implementations, the SOC 410 includes a processor 420, a memory 422, and a set of programmable resources 424 interconnected by an internal data bus 418. The programmable resources 424 may include several different types of programmable logic blocks that are arranged in an array. For example, the programmable logic can include a large number of different programmable tiles such as multi-gigabit transceivers (MGTs), configurable logic blocks (CLBs), random access memory blocks (BRAMs), input/output blocks (IOBs), configuration and clocking logic, digital signal processing blocks, specialized input/output blocks, for example, clock ports, and other programmable logic such as digital clock managers, analog-to-digital converters, system monitoring logic, and so forth. The SOC 410 also includes a data bus interface 412 configured to communicate data between the internal data bus 418 and the external data bus 430. In this example, the data bus interface 412 includes an endpoint module 414 configured to communicate data via the external bus. A bridge circuit 416 is configured to facilitate transfer of data between the endpoint module 414 and the internal data bus 418.

In some implementations, the host device 440 includes a processor circuit 448 and local memory 450 interconnected by a local bus 454. In certain implementations, the processor circuit 448 and local memory 450 could be part of an X-86 system, for example. However, other types of processor systems are also possible. The host device 440 also includes a bus interface 442 configured to communicate data over the external data bus 430. In this example, the bus interface 442 includes a root module 444 that is configured to operate as the root complex for external data bus. The bus interface 442 also includes a bridge circuit 446 configured to transfer data between the root module 444 and the internal data bus 454 of the host device 440.

As previously indicated, data buses may be implemented using various data bus architectures. In this example, the external data bus 430 is implemented using the PCIe architecture and internal data buses 418 and 454 are implemented using the AXI architecture. However, any of the data busses 418, 430, and/or 454 may be implemented using other data bus architectures as well.

Images for booting of the SOC are stored in the memory 450 of the host device 440. At start-up of the SOC, processor 420 can function as a boot processor that loads a boot ROM from a non-volatile memory (e.g., 422). The boot ROM code can contain instructions that causes the processor 420 to retrieve one or more boot images 452 from the memory 450 on the host device 440, for example, using the processes shown in FIG. 1, 2, or 3.

As an illustrative example, the boot ROM code may cause the processor circuit 420 to retrieve and execute an FSBL image to the SOC. In some implementations, the FSBL may be retrieved from the memory 422 on the SOC. In some other implementations, the FSBL may be retrieved by prompting the processor 448 of the host device 440 to provide an FSBL image to the SOC, for example, using PIO transfers.

As described with reference to FIG. 1, the SOC may provide a notification to the SOC once the FSBL image is loaded. According to some implementations, notifications may be communicated from the SOC to the host device 440 by writing data to a scratch pad memory region of on-chip memory 422. A software driver running on the host device 440 can be configured to detect when a flag is set in the scratch pad memory region of on-chip memory 422. This detection can include, for example, polling the scratch pad memory region. Additionally or alternatively, the SOC may prompt bridge circuit 446 to generate a local shared peripheral interrupt to the processor 448. The host device 440 can respond to detection of the flag by communicating a host address from which the SOC may retrieve a boot image. In response to the notification, the host device may communicate a memory location to the SOC where an SSBL is located in the memory 450 of the host device 440.

Execution of the FSBL image causes the processor 420 to configure the data bus interface 412 to perform egress address translation mapping a first block of addresses for the internal data bus 418 to a second block of addresses for the internal data bus 454 starting at the received memory address. As previously described, the address translation allows the processor 420 on the SOC 410 to issue data transactions to the second block of addresses in memory 450 via the first block of addresses. When the host enables bus mastering of the external data bus 430, execution of the FSBL image causes the processor 420 to retrieve the SSBL image by issuing read requests to addresses in the first block of addresses. As previously described, because read requests are issued directly by the processor on the SOC, a dedicated DMA control circuit may be omitted and manufacturing costs may be reduced. After the SSBL is successfully retrieved, the SSBL image is executed by the processor 420.

Figure 5:
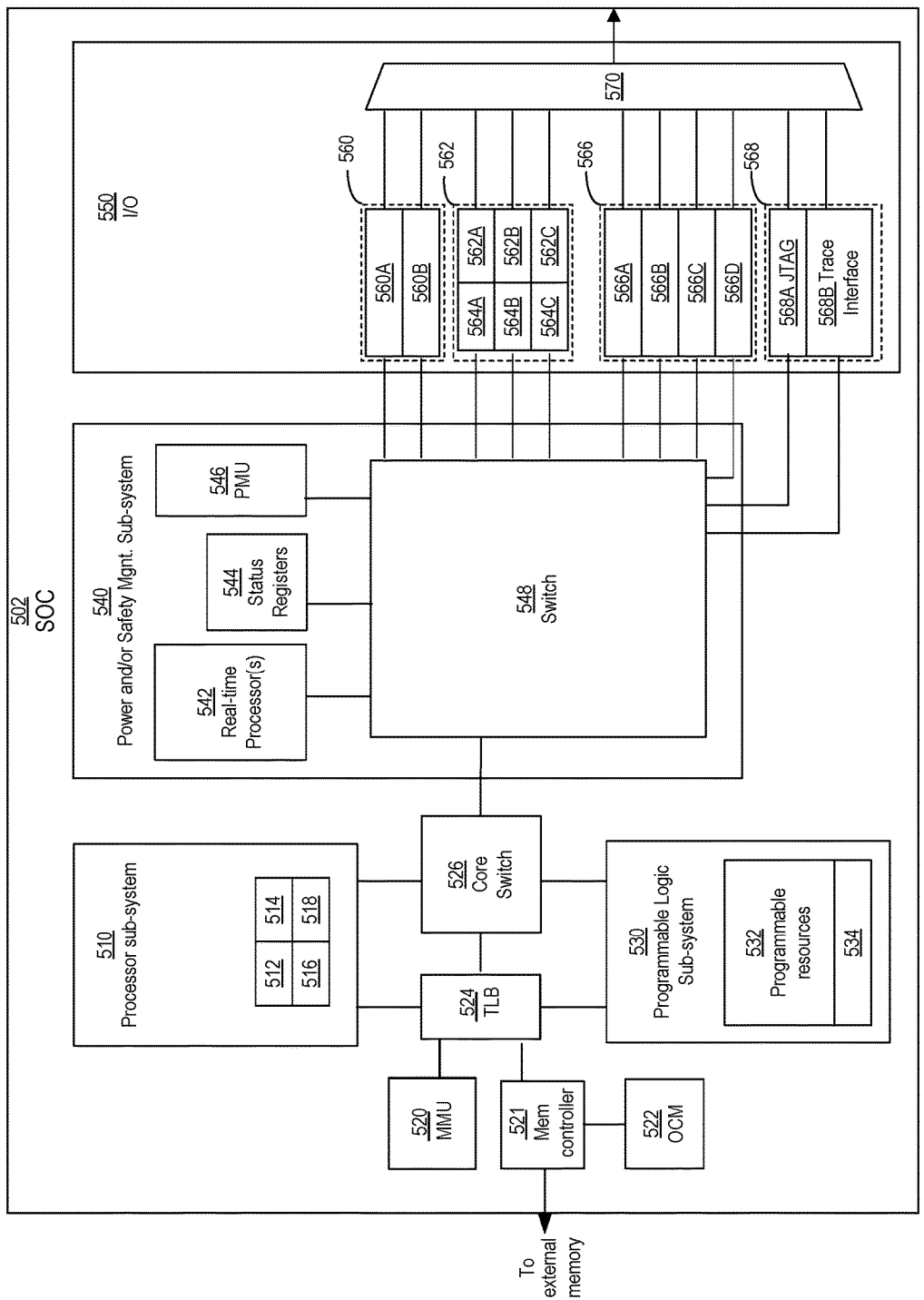
FIG. 5 shows an example SOC that may be configured using the disclosed processes.

FIG. 5 shows an example SOC that may be configured using the disclosed processes. The SOC may also be referred to as a System On Chip (SOC), which includes a processor sub-system 510 and a programmable logic sub-system 530. In this example, the SOC also includes a sub-system 540 having various circuits for power and/or safety management and an input/output (I/O) sub-system 550 for communication of data with external circuits. The subsystems 510, 530, 540, and 550 may be formed using a plurality of semiconductor dies, and interconnected in an IC package as described in the above examples.

The processing sub-system 510 may be programmed to implement a software portion of the circuit design, via execution of a user program. Alternatively or additionally, the program may implement one or more traffic generators configured to generate data signals to one or more ports of a partial circuit design implemented in programmable resources 532. The program may be specified as part of a configuration data stream or may be retrieved from an on-chip or off-chip data storage device. The processing sub-system 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

The programmable logic sub-system 530 of the SOC 502 may be programmed to implement a partial circuit design and traffic generation circuits as previously discussed. For instance, the programmable logic sub-system may include a number of programmable resources 532, which may be programmed to implement a set of circuits specified in a configuration data stream. The programmable resources 532 include programmable interconnect circuits, programmable logic circuits, and configuration memory cells. The programmable logic implements the logic of a circuit design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. The collective states of the individual memory cells then determine the function of the programmable resources 532. The configuration data can be read from memory (e.g., from an external PROM) or written into the SOC 502 by an external device. In some implementations, configuration data may be loaded into configuration memory cells by a configuration controller 534 included in the programmable logic sub-system 530. In some other implementations, the configuration data may be loaded into the configuration memory cells by a start-up process executed by the processor sub-system 510.

The SOC 502 may include various circuits to interconnect the processing sub-system 510 with circuitry implemented within the programmable logic sub-system 530. In this example, the SOC 502 includes a core switch 526 that can route data signals between various data ports of the processing sub-system 510 and the programmable logic sub-system 530. The core switch 526 may also route data signals between either of the programmable logic or processing sub-systems 510 and 530 and various other circuits of the SOC, such as an internal data bus. Alternatively or additionally, the processing sub-system 510 may include an interface to directly connect with the programmable logic sub-system—bypassing the core switch 526. Such an interface may be implemented, for example, using the AMBA AXI Protocol Specification (AXI) as published by ARM.

In some implementations, the processing sub-system 510 and the programmable logic sub-system 530 may also read or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the SOC 502 may include a memory management unit 520 and translation look-aside buffer 524 to translate virtual memory addresses used by the sub-systems 510 and 530 to physical memory addresses used by the memory controller 521 to access specific memory locations.

In this example, the SOC includes an I/O sub-system 550 for communication of data with external circuits. The I/O sub-system 550 may include various types of I/O devices or interfaces including for example, flash memory type I/O devices, higher performance I/O devices, lower performance interfaces, debugging I/O devices, and/or RAM I/O devices.

The I/O sub-system 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 550 can include one or more interfaces 562 providing a higher level of performance than flash memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface. One or more of interfaces 562 can be implemented as a PCIe interface.

The I/O sub-system 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an I²C type of interface. One or more of interfaces 566 also can be implemented in the form of a Triple Timer Counter (TTC) and/or a Watchdog Timer (WDT) type of interface.

The I/O sub-system 550 can include one or more debug interfaces 568 such as processor JTAG (PJTAG) interface 568A and a trace interface 568B. PJTAG interface 568A can provide an external debug interface for the SOC 502. Trace interface 568B can provide a port to receive debug, e.g., trace, information from the processing sub-system 510 or the programmable logic sub-system 530.

As shown, each of interfaces 560, 562, 566, and 568 can be coupled to a multiplexer 570. Multiplexer 570 provides a plurality of outputs that can be directly routed or coupled to external pins of the SOC 502, e.g., balls of the package within which the SOC 502 is disposed. For example, I/O pins of SOC 502 can be shared among interfaces 560, 562, 566, and 568. A user can configure multiplexer 570, via a configuration data stream to select which of interfaces 560-568 are to be used and, therefore, coupled to I/O pins of SOC 502 via multiplexer 570. The I/O sub-system 550, may also include a fabric multiplexer I/O (FMIO) interface (not shown) to connect interfaces 562-568 to programmable logic circuits of the programmable logic sub-system. Additionally or alternatively, the programmable logic sub-system 530 can be configured to implement one or more I/O circuits within programmable logic. In this example, the SOC 502 includes sub-system 540 having various circuits for power and/or safety management. For example, the sub-system 540 may include a power management unit 546 configured to monitor and maintain one or more voltage domains used to power the various sub-systems of the SOC 502. In some implementations, the power management unit 546 may disable power of individual sub-systems, when idle, to reduce power consumption, without disabling power to sub-systems in use.

The sub-system 540 may also include safety circuits to monitor the status of the sub-systems to ensure correct operation. For instance, the sub-system 540 may include one or more real-time processors 542 configured to monitor the status of the various sub-systems (e.g., as indicated in status registers 544). The real-time processors 542 may be configured to perform a number of tasks in response to detecting errors. For example, for some errors, the real-time processors 542 may generate an alert in response to detecting an error. As another example, the real-time processors 542 may reset a sub-system to attempt to restore the sub-system to correct operation. The sub-system 540 includes a switch network 548 that may be used to interconnect various sub-systems. For example, the switch network 548 may be configured to connect the various sub-systems 510, 530, and 540 to various interfaces of the I/O sub-system 550. In some applications, the switch network 548 may also be used to isolate the real-time processors 542 from the sub-systems that are to be monitored. Such isolation may be required by certain application standards (e.g., IEC-61508 SIL3 or ISO-26262 standards) to ensure that the real-time processors 542 are not affected by errors that occur in other sub-systems.

The methods and system are thought to be applicable to a variety of systems that use SOCs. Other aspects and features will be apparent to those skilled in the art from consideration of the specification. For instance, although aspects and features may in some cases be described in individual figures, it will be appreciated that features from one figure can be combined with features of another figure even though the combination is not explicitly shown or explicitly described as a combination. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A method comprising:

loading boot read only memory (ROM) code for execution by a processor circuit of a system-on-chip (SoC);

retrieving a first boot image by execution of the boot ROM code on the processor circuit, wherein the retrieving of the first boot image includes communicating the first boot image from a host device to the SoC via a bus interface circuit in the SoC using programmable input/output data transfers performed by a processor circuit of the host device;

receiving a memory address from a processor circuit of the host device by the processor circuit of the SoC via an external data bus, wherein the processor circuit of the SoC is coupled to the external data bus by an internal data bus and the bus interface circuit;

executing the first boot image by the processor circuit of the SoC, wherein execution of the first boot image causes the processor circuit of the SoC to:

configure the bus interface circuit to translate a first block of addresses on the internal data bus to a second block of addresses on the host device beginning at the received memory address; and retrieve, in response to bus mastering by the bus interface circuit being enabled, a second boot image stored at the second block of addresses on the host device by issuing read requests to addresses in the first block of addresses; and execute the second boot image.

2. The method of claim 1, wherein the executing of the second boot image causes the processor circuit of the SoC to configure a set of programmable hardware resources to implement a hardware portion of the design.

3. The method of claim 2, wherein the executing of the second boot image causes the processor circuit of the SoC to execute a software portion of the design that is configured to interact with the hardware portion.

4. The method of claim 1, wherein the retrieval of the first boot image by execution of the boot ROM code includes configuring, in response to receiving a second memory address of the first boot image in the memory of the host device, the bus interface circuit to translate a third block of addresses on the internal data bus to a fourth block of addresses on the host device beginning at the received second memory address.

5. The method of claim 4, further comprising configuring, in response to the first boot image being in error, the bus interface circuit to translate the third block of addresses to a fifth block of addresses, wherein a different copy of the first boot image is stored at the fifth block of addresses on the host device.

6. The method of claim 1, wherein receiving the memory address from the host device includes writing the memory address to a scratch pad memory space in the SoC.

7. The method of claim 6, further comprising: storing, in response to retrieving the first boot image, a value in the scratch pad memory space of the SoC, the value indicating to the host device that the first boot image was retrieved.

8. The method of claim 1, further comprising enabling bus mastering by writing a data value from the host device to a register on the SoC via the external data bus.

9. The method of claim 1, further comprising configuring, in response to the second boot image being in error, the bus interface circuit to translate the first block of addresses on the internal data bus to a third block of addresses on the host device, wherein a different copy of the second boot image is stored at the third block of addresses.

10. A system, comprising:
a system-on-chip (SoC) that includes:
an internal data bus;
read-only-memory (ROM) coupled to the internal data bus;
a bus interface circuit coupled to the internal data bus and configured to communicate with a host device coupled to the SoC via an external data bus; and
a processor circuit coupled to the internal data bus; and
wherein:
the processor circuit of the SoC is configured to, when powered on, retrieve and execute a set of boot code stored in the ROM,
execution of the boot code by the processor circuit of the SoC causes the processor circuit of the SoC to retrieve and execute a first boot image,
the set of boot code stored in the ROM is configured to prompt the host device to communicate the first boot image to the SoC via the bus interface circuit using programmable input/output data transfers, and
execution of the first boot image by the processor circuit of the SoC causes the processor circuit of the SoC to:
configure, in response to receiving a memory address from a processor of the host device, the bus interface circuit to translate a first block of addresses on the internal data bus to a second block of addresses on the host device starting at the memory address,
retrieve, in response to bus mastering by the bus interface circuit being enabled, a second boot image stored at the second block of addresses on the host device by issuing read requests to addresses in the first block of addresses, and
execute the second boot image.

11. The system of claim 10, wherein execution of the second boot image by the processor circuit of the SoC causes the processor circuit of the SoC to implement a software portion of a design.

12. The system of claim 11, wherein execution of the second boot image causes the processor circuit of the SoC to configure a set of programmable hardware resources to implement a hardware portion of the design.

13. The system of claim 10, wherein:
the retrieval of the first boot image by execution of the set of boot code stored in the ROM includes, in response to receiving an address of the first boot image in the memory address of the host device, configuring the bus interface circuit to translate a third block of addresses on the internal data bus to a fourth block of addresses on the host device starting at a second memory address; and
the set of boot code stored in the ROM is further configured to:
verify the first boot image; and
in response to the first boot image being in error, configure the bus interface circuit to translate the third block of addresses on the internal data bus to a fifth block of addresses on the host device starting at the second memory address.

14. The system of claim 10, wherein the processor circuit of the SoC is configured to receive the memory address from the host device via a scratch pad memory space in the SoC.

15. The system of claim 14, wherein the set of boot code stored in the ROM further causes the processor circuit of the SoC to store a value to the scratch pad memory space of the SoC in response to receiving the first boot image.

16. The system of claim 10, wherein the first boot image causes the processor circuit of the SoC to verify the second boot image and in response to the second boot image being in error, configure the bus interface circuit to translate the first block of addresses on the internal data bus to a third block of addresses on the host device at which a different copy of the second boot image is stored on the host device.

17. The system of claim 10, wherein the host device is configured to enable bus mastering by writing a data value to a register on the SoC via the external data bus.

18. The system of claim 10, further comprising the host device, and wherein the external data bus is a Peripheral Component Interconnect Express (PCIe) data bus.

* * * * *